(12) United States Patent
Ando et al.

(10) Patent No.: US 12,267,452 B2
(45) Date of Patent: Apr. 1, 2025

(54) ELECTRONIC DEVICE

(71) Applicant: KYOCERA CORPORATION, Kyoto (JP)

(72) Inventors: Kouichi Ando, Yokohama (JP); Masatoshi Toyama, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 370 days.

(21) Appl. No.: 17/584,263

(22) Filed: Jan. 25, 2022

(65) Prior Publication Data

US 2022/0239771 A1 Jul. 28, 2022

(30) Foreign Application Priority Data

Jan. 27, 2021 (JP) ................. 2021-011527

(51) Int. Cl.
*H04M 1/03* (2006.01)
*G06F 1/16* (2006.01)
*H04M 1/18* (2006.01)

(52) U.S. Cl.
CPC ............ *H04M 1/03* (2013.01); *G06F 1/1656* (2013.01); *H04M 1/18* (2013.01)

(58) Field of Classification Search
CPC .......... H04M 1/03; H04M 1/18; H04M 1/185; G06F 1/1656; G06F 2200/1633; G06F 1/1626
USPC ...................................... 455/575.8
See application file for complete search history.

(56) References Cited

U.S. PATENT DOCUMENTS

| | | | | |
|---|---|---|---|---|
| 2006/0042996 A1* | 3/2006 | Picot | ...................... | A45C 13/02 |
| | | | | 206/576 |
| 2013/0301863 A1* | 11/2013 | Weaver, III | .......... | H04R 1/2853 |
| | | | | 381/334 |
| 2021/0048847 A1* | 2/2021 | Fenton | .................. | G06F 1/1628 |

FOREIGN PATENT DOCUMENTS

JP 2015215184 A 12/2015

* cited by examiner

*Primary Examiner* — Eugene Yun
(74) *Attorney, Agent, or Firm* — HAUPTMAN HAM, LLP

(57) ABSTRACT

A protecting part disposed to cover a part of a screen unit serving as a first surface of a housing is provided to a smartphone serving as an electronic device. The protecting part includes contact parts located at both ends in the longitudinal direction and being in contact with the screen unit. A separation part is located between the contact parts and separated from the screen unit, so that a large impact can be suppressed from acting on the screen unit.

17 Claims, 11 Drawing Sheets

ELECTRONIC DEVICE

CROSS-REFERENCE TO RELATED APPLICATION

The present application claims priority to and the benefit of Japanese Patent Application No. 2021-011527 filed Jan. 27, 2021, the entire contents of which are incorporated herein by reference.

TECHNICAL FIELD

The present disclosure relates to an electronic device.

BACKGROUND

Some electronic devices can be used while being held by a user's hand, but when the user holds or carries an electronic device by hand, the electronic device may be dropped by mistake. Thus, some conventional electronic devices are provided with a bumper for absorbing an impact acting on the electronic devices.

SUMMARY

While the bumper used in such an electronic device as described above is, by attaching the bumper to corner parts of a housing of the electronic device, effective for absorbing an impact acting on any of the corner parts, it is difficult to absorb an impact acting on a flat surface portion of the electronic device when the electronic device is dropped or the like, and thus there is room for improvement in terms of impact resistance.

The present disclosure has been made in light of the foregoing, and an object thereof is to provide an electronic device capable of improving impact resistance.

DESCRIPTION OF EMBODIMENTS

Embodiments of the electronic device according to the present disclosure will be described below in detail based on the drawings. Note that the embodiments are not intended to limit the present disclosure. Furthermore, constituent elements in the embodiments described below include those that can be replaced and easily conceived by a person skilled in the art and include those that are substantially identical to said constituent elements.

Embodiment

Figure 1:
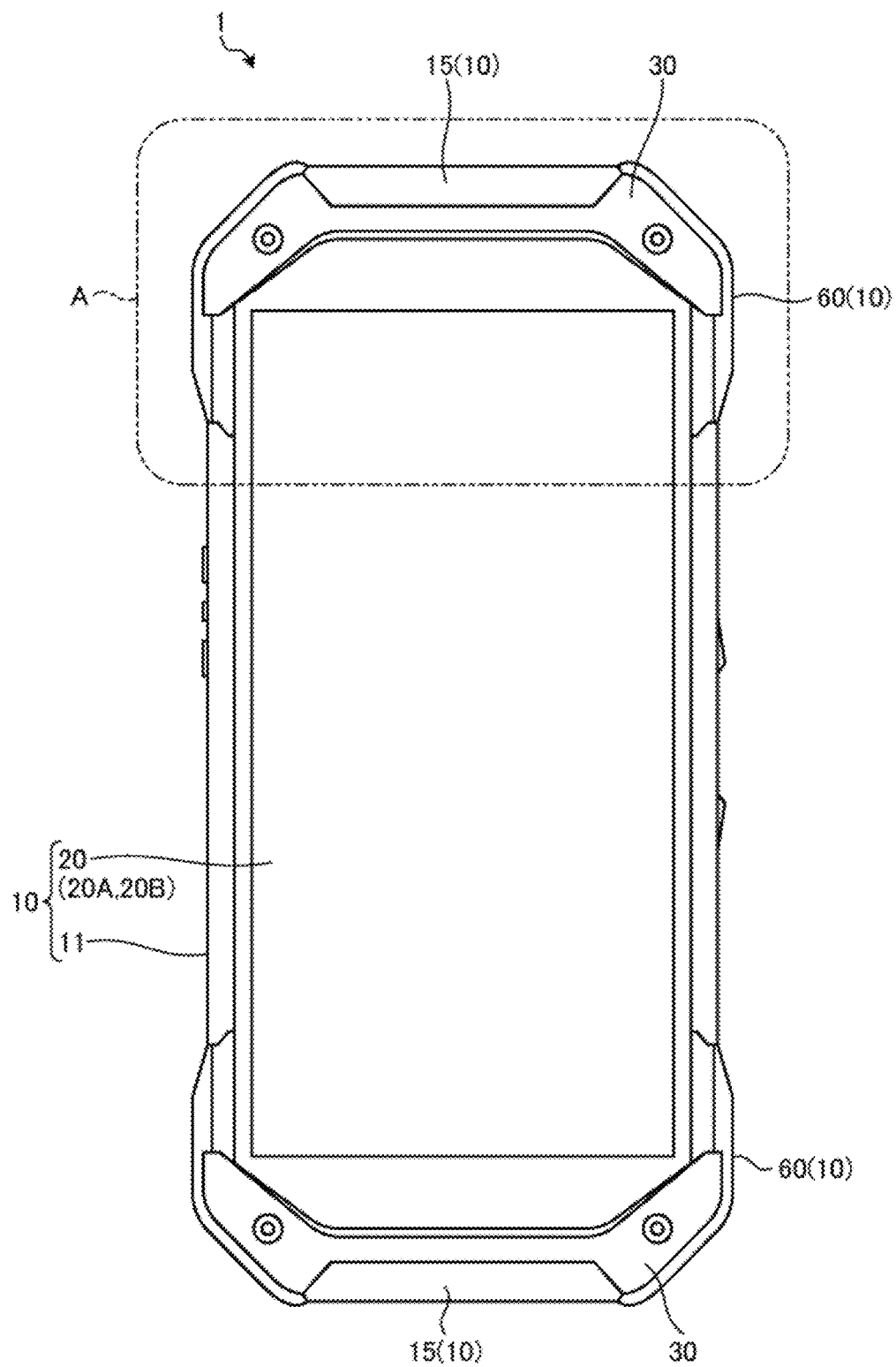
FIG. 1 is a front view of a smartphone according to one of embodiments.
Figure 2:
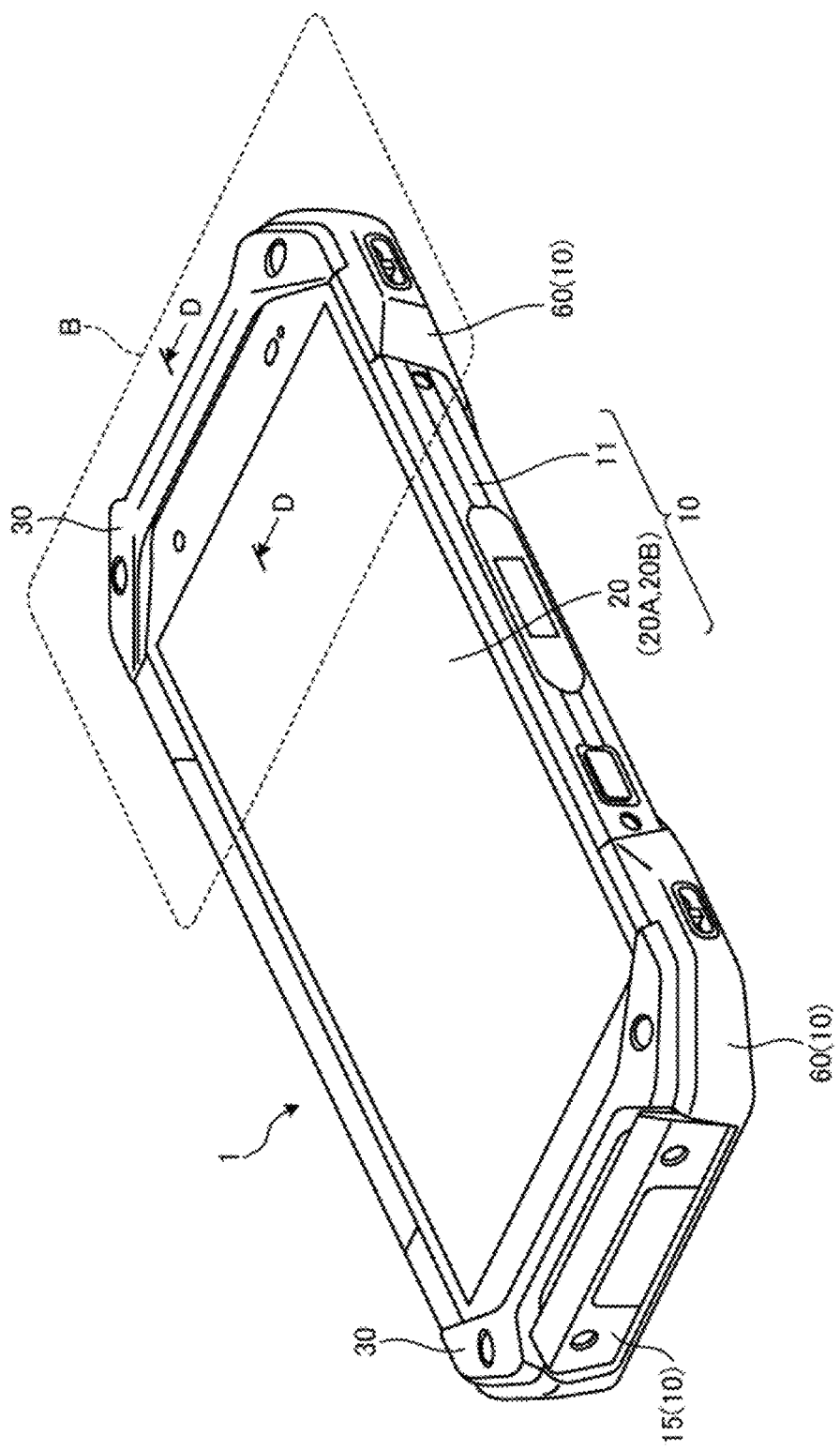
FIG. 2 is a perspective view of the smartphone illustrated in FIG. 1.

FIG. 1 is a front view of a smartphone 1 according to one of embodiments. FIG. 2 is a perspective view of the smartphone 1 illustrated in FIG. 1. The smartphone 1 according to the present embodiment is an electronic device, and communicates wirelessly using a communication unit to make calls and transmit and receive data. The communication scheme supported by the communication unit is a wireless communication standard. Examples of the wireless communication standard include a communication standard of a cellular phone such as 2G, 3G, and 4G. The communication standard of the cellular phone includes, for example, Long Term Evolution (LTE), Wideband Code Division Multiple Access (W-CDMA), CDMA 2000 (Wideband Code Division Multiple Access 2000), Personal Digital Cellular (PDC), Global System for Mobile Communications (GSM) (trade name), and Personal Handy-phone System (PHS). Examples of the Wireless communication standard further include Worldwide Interoperability for Microwave Access (WiMAX), IEEE 802.11, Bluetooth (trade name), Infrared Data Association (IrDA), and Near Field Communication (NFC). The communication unit may support one or more of the communication standards described above.

The smartphone 1 includes a storage and a controller for controlling and implementing various operations. The storage stores programs and data. The storage may also be utilized as a work region to temporarily store the processing results of the controller. The storage may include any non-transitory storage medium such as a semiconductor storage medium and a magnetic storage medium. The storage may include a plurality of types of the storage medium. The storage may include a combination of a portable storage medium such as a memory card, an optical disk, or a magneto-optical disk and a reading device of the storage medium. The storage may include a storage device utilized as a temporary storage region such as a Random Access Memory (RAM). The controller is an arithmetic processing device. Examples of the arithmetic processing device include but are not limited to a Central Processing Unit (CPU), a System-on-a-chip (SoC), a Micro Control Unit (MCU), and a Field-Programmable Gate Array (FPGA). The controller comprehensively controls the operations of the smartphone 1, thereby implementing various functions.

As illustrated in FIGS. 1 and 2, the smartphone 1 is formed in a rectangular parallelepiped shape having a small thickness, or a plate-like shape with a substantially rectangular shape when viewed in the thickness direction. The smartphone 1 includes a housing 10 forming an exterior, and the housing 10 includes a case part 11 and a screen unit 20. The case part 11 is a portion serving as a base of the housing 10, and forms a back surface (a surface on the opposite side when the surface on the side illustrated in FIG. 1 is a front surface) and side surfaces of the smartphone 1. The screen unit 20 forms a first surface serving as one surface of the housing 10 and is disposed in front of the smartphone 1. Thus, the screen unit 20 is formed in a substantially rectangular shape. The smartphone 1 is formed by disposing each device including the storage and the controller in a space inside the housing 10 formed by combining the case part 11 and the screen unit 20.

The screen unit 20 is a so-called touch screen display, and includes a display 20A serving as a display unit of information on the smartphone 1, and a touch screen 20B serving as an input unit for performing input operations on the smartphone 1. The display 20A and the touch screen 20B are each formed in a substantially rectangular shape and are disposed to overlap with each other. In other words, the display 20A and the touch screen 20B are disposed such that the long side of the display 20A is along the long side of the touch screen 20B, and the short side of the display 20A is along the short side of the touch screen 20B.

The display 20A includes a display device such as a Liquid Crystal Display (LCD), an Organic Electro-Luminescence Display EL (OELD), or an Inorganic Electro-Luminescence Display (IELD). The display 20A displays characters, images, symbols, graphics, and the like.

The touch screen 20B detects contact of a finger, a pen, or a stylus pen, or the like with respect to the touch screen 20B. The touch screen 20B can detect a position where a plurality of fingers, a pen, a stylus pen, or the like is in contact with the touch screen 20B.

A detection method of the touch screen 20B may be any method such as a capacitive method, a resistive method, a surface acoustic wave method, and a load detection method. In the following description, for ease of explanation, a user is assumed to touch the touch screen 20B using a finger in order to operate the smartphone 1.

The smartphone 1 determines a type of a gesture based on at least one of a contact detected by the touch screen 20B, the position at which a contact is detected, a change in the position at which a contact is detected, an interval during which a contact is detected, and the number of times a contact is detected. The gesture is an operation performed with respect to the touch screen 20B. The gesture determined by the smartphone 1 includes, for example, but is not limited to, a touch, a long touch, a release, a swipe, a tap, a double tap, a long tap, a drag, a flick, a pinch in, and a pinch out.

The smartphone 1 performs an operation in accordance with these gestures that are determined via the touch screen 20B. Thus, intuitive and easy-to-use operability is realized for the user. The operation performed by the smartphone 1 in accordance with the determined gesture may vary in accordance with the screen displayed on the display 20A.

The smartphone 1 includes protecting parts 30 that protect the screen unit 20, on a surface on a side on which the screen unit 20 is disposed. The protecting parts 30 are disposed at two positions near both ends of a rectangular shape in the longitudinal direction, which is the shape of the screen unit 20, on the surface of the smartphone 1 on the side where the screen unit 20 is disposed. In other words, the protecting parts 30 are disposed at both ends of the smartphone 1 in the longitudinal direction. The protecting parts 30 at the two positions are each formed of a member having elasticity such as a resin material, and are disposed to cover a part of the screen unit 20.

Figure 3:
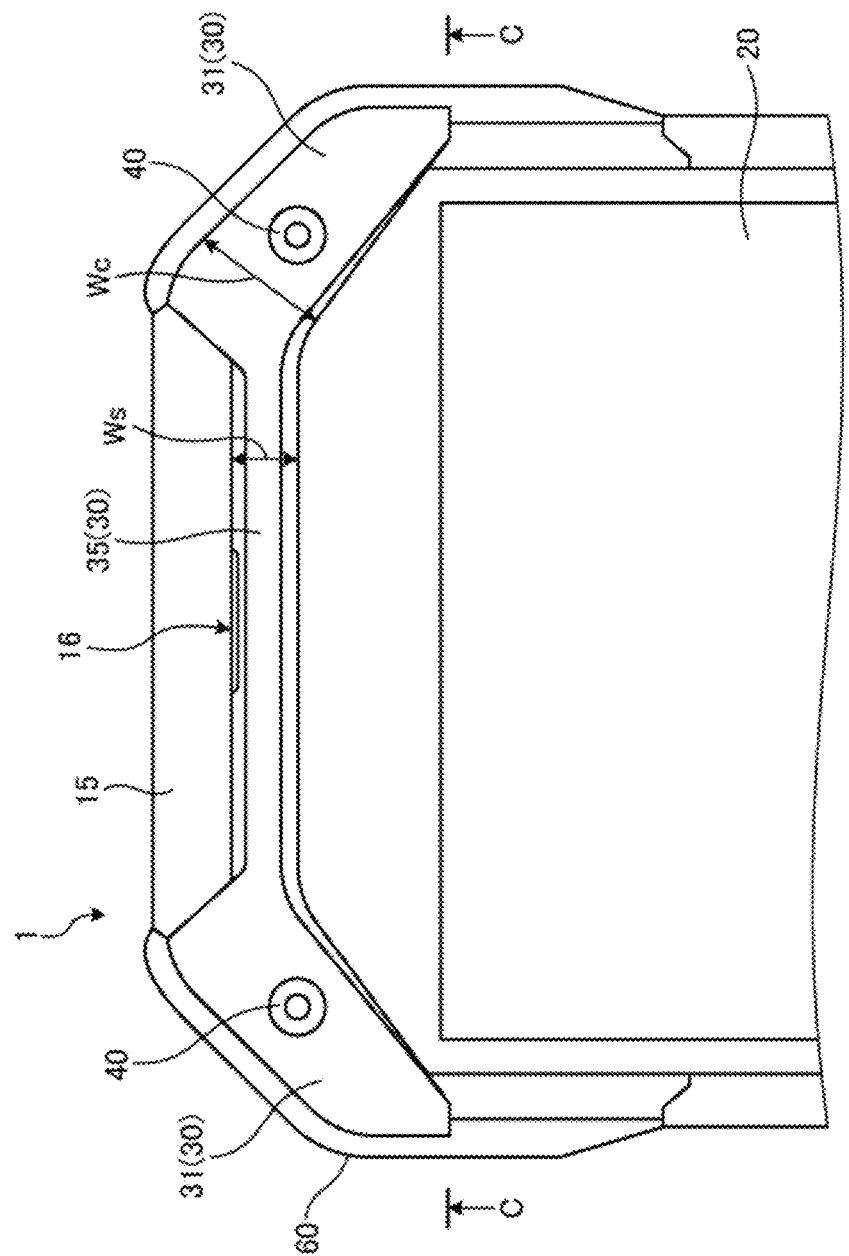
FIG. 3 is a detailed view of a part A in FIG. 1.
Figure 4:
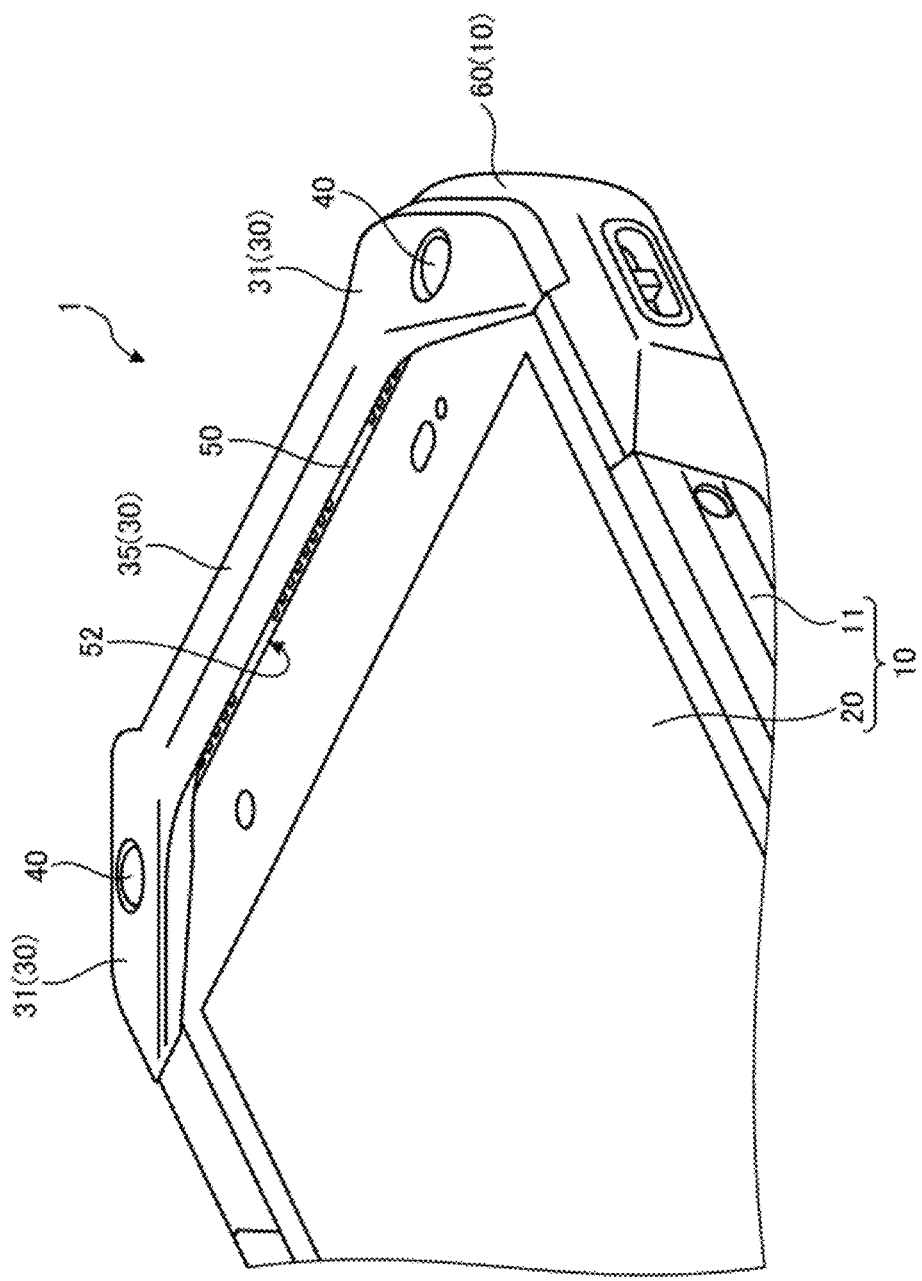
FIG. 4 is a detailed view of a part B in FIG. 2.

FIG. 3 is a detailed view of a part A in FIG. 1. FIG. 4 is a detailed view of a part B in FIG. 2. The protecting parts 30 disposed near both ends in the longitudinal direction of the smartphone 1 are disposed from one end side to the other end side in the lateral direction of the smartphone 1. Each of the protecting parts 30 has a width in the longitudinal direction of the smartphone 1 significantly smaller than the length of the smartphone 1 in the lateral direction. In other words, the length of the protecting part 30 in the longitudinal direction is the same as the length of the smartphone 1 in the lateral direction, that is, the protecting part 30 is as long as the housing 10 in the lateral direction and is disposed near the end part of the smartphone 1 in the longitudinal direction with the longitudinal direction of the protecting part 30 oriented along the lateral direction of the smartphone 1.

The protecting part 30 is disposed on the surface of the smartphone 1 on the side where the screen unit 20 is disposed and thus covers the vicinity of the end part of the screen unit 20 in the longitudinal direction. The protecting part 30 has a bridge structure in which both ends in the longitudinal direction of the protecting part 30 are in contact with the screen unit 20, and the vicinity of the center of the protecting part 30 in the longitudinal direction is separated from the screen unit 20.

Specifically, the protecting part 30 includes contact parts 31 located at both ends of the protecting part 30 in the longitudinal direction and being in contact with the screen unit 20, and a separation part 35 located between the contact parts 31 and separated from the screen unit 20. In other words, in the protecting part 30, the contact parts 31 disposed at two positions at both ends in the longitudinal direction of the protecting part 30 are in contact with the screen unit 20 near both ends in the lateral direction of the screen unit 20, that is, near the long sides of the screen unit 20. In the protecting part 30 the separation part 35 located between the contact parts 31 located at two positions at both ends in the longitudinal direction of the protecting part 30 is not in contact with the screen unit 20 and is separated from the screen unit 20.

Figure 5:
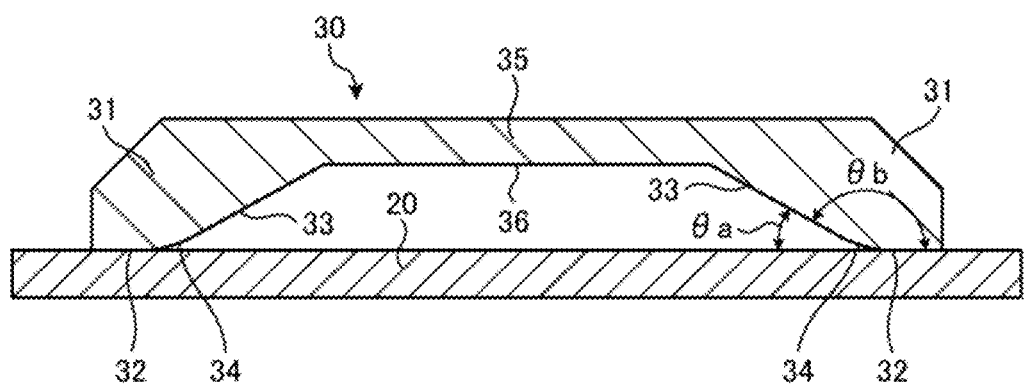
FIG. 5 is a schematic view illustrating a form of a protecting part as viewed in the direction of arrow C-C in FIG. 3.

FIG. 5 is a schematic view illustrating a form of a protecting part 30 as viewed in the direction of the arrow C-C in FIG. 3. The contact parts 31 of the protecting part 30 are formed such that the distance from the screen unit 20 gradually increases from contact surfaces 32, which are respective portions of the contact parts 31 in contact with the screen unit 20, toward the separation part 35 side in the longitudinal direction of the protecting part 30. In other words, in the contact parts 31 of the protecting part 30, side surfaces 33, which are surfaces of the contact parts 31 located on the separation part 35 side, face the screen unit 20, and are inclined with respect to the screen unit 20 in a direction in which the distance from the screen unit 20 increases from the contact surface 32 side toward the separation part 35 side.

Thus, in the contact parts 31 of the protecting part 30, an angle θa formed by each of the side surfaces 33 of the contact parts 31 on the separation part 35 side and the screen unit 20 is an acute angle. In this case, the angle θa formed by the side surfaces 33 of the contact part 31 and the screen unit 20 is an angle formed by a portion extending from a portion of the screen unit 20 with which the contact surface 32 is in contact toward the separation part 35 side of the protecting part 30 and the side surface 33 of the contact part 31.

Since, in this manner, the angle θa formed by the side surface 33 of the contact part 31 and the screen unit 20 is an acute angle, an angle θb formed by the contact surface 32 and the side surface 33 of the contact part 31 is an obtuse angle when the protecting part 30 is viewed as a single body.

In each of the contact parts 31 of the protecting part 30, the contact surface 32 and the side surface 33 are connected to each other by a curved surface. In other words, in each of the contact parts 31, a curved surface part 34, which is a curved chamfered part, is formed between the contact surface 32 and the side surface 33. As a result, the contact surfaces 32 and the side surfaces 33 included in the contact parts 31 of the protecting part 30 are connected to each other via the curved surface parts 34 formed in a curved shape, in other words, the contact surfaces 32 and the side surfaces 33 are respectively connected to each other by curved surfaces.

Each of the protecting parts 30 including the contact parts 31 and the separation part 35 is formed to be bent at positions near the end parts of the separation part 35 in the longitudinal direction when viewed from a direction of viewing the screen unit 20 from the front. Specifically, when the protecting part 30 is viewed from a direction of viewing the screen unit 20 from the front, a direction in which the protecting part 30 extends changes at boundary portions between the separation part 35 and the contact parts 31. As a result, the contact parts 31 located at the two positions on both sides of the separation part 35 are bent with respect to the separation part 35 and are connected to the separation part 35.

The bending directions of the contact parts 31 with respect to the separation part 35 are the same direction as each other, in the contact parts 31 located at the two positions on both sides of the separation part 35. In other words, in a state in which the protecting part 30 is disposed near one end part in the longitudinal direction of the smartphone 1, the contact parts 31 located at the two positions on both sides of the separation part 35 are bent with respect to the separation part 35 in a direction approaching the other end part in the longitudinal direction of the smartphone 1 away from the separation part 35. The protecting part 30 is bent at the boundary portions between the contact parts 31 and the separation part 35 in this manner, so that the direction in which the protecting part 30 extends when viewing the screen unit 20 from the front changes at the boundary portions between the contact parts 31 and the separation part 35. As a result, the protecting part 30 is formed such that the directions in which the contact parts 31 extend and the direction in which the separation part 35 extends are different from each other.

In addition, the width of the protecting part 30 differs between the contact parts 31 and the separation part 35, and a width in a direction orthogonal to the direction in which the protecting part 30 extends is narrower in the separation part 35 than in the contact parts 31 when viewing the screen unit 20 from the front. In other words, in the protecting part 30, a width Ws of the separation part 35 in a direction orthogonal to the direction in which the separation part 35 extends is narrower than a width Wc of the contact parts 31 in a direction orthogonal to the directions in which the contact parts 31 extend when viewing the screen unit 20 from the front.

In the protecting part 30, in this manner, the width Ws of the separation part 35 is narrower than the width Wc of the contact parts 31, in other words, the width Wc of the contact parts 31 is wider than the width Ws of the separation part 35, so that the contact parts 31 include a step corresponding to the difference in width relative to the separation part 35. The step of the contact parts 31 with respect to the separation part 35 is formed in an opposite direction to directions in which the contact parts 31 bend with respect to the separation part 35 when viewed from a direction in which the screen unit 20 is viewed from the front. As a result, the contact parts 31 are formed to protrude from the separation part 35 by a difference in width between the contact parts 31 and the separation part 35 toward the opposite direction to the directions in which the contact parts 31 bend with respect to the separation part 35.

The protecting part 30 is detachably attached to the housing 10 by screws 40. Specifically, the protective portion 30 is fixed to the case portion 11 by the screws 40. The protecting part 30 covers a part of the screen unit 20.

In the present embodiment, in the protecting part 30, the holes through which the screws 40 are passed are formed in respective ones of the contact parts 31 disposed at the two positions on both sides in the direction in which the separation part 35 extends, and the protecting part 30 can be attached to the case part 11 by using the through holes for the screws 40 formed in the contact parts 31 in the two positions.

Figure 6:
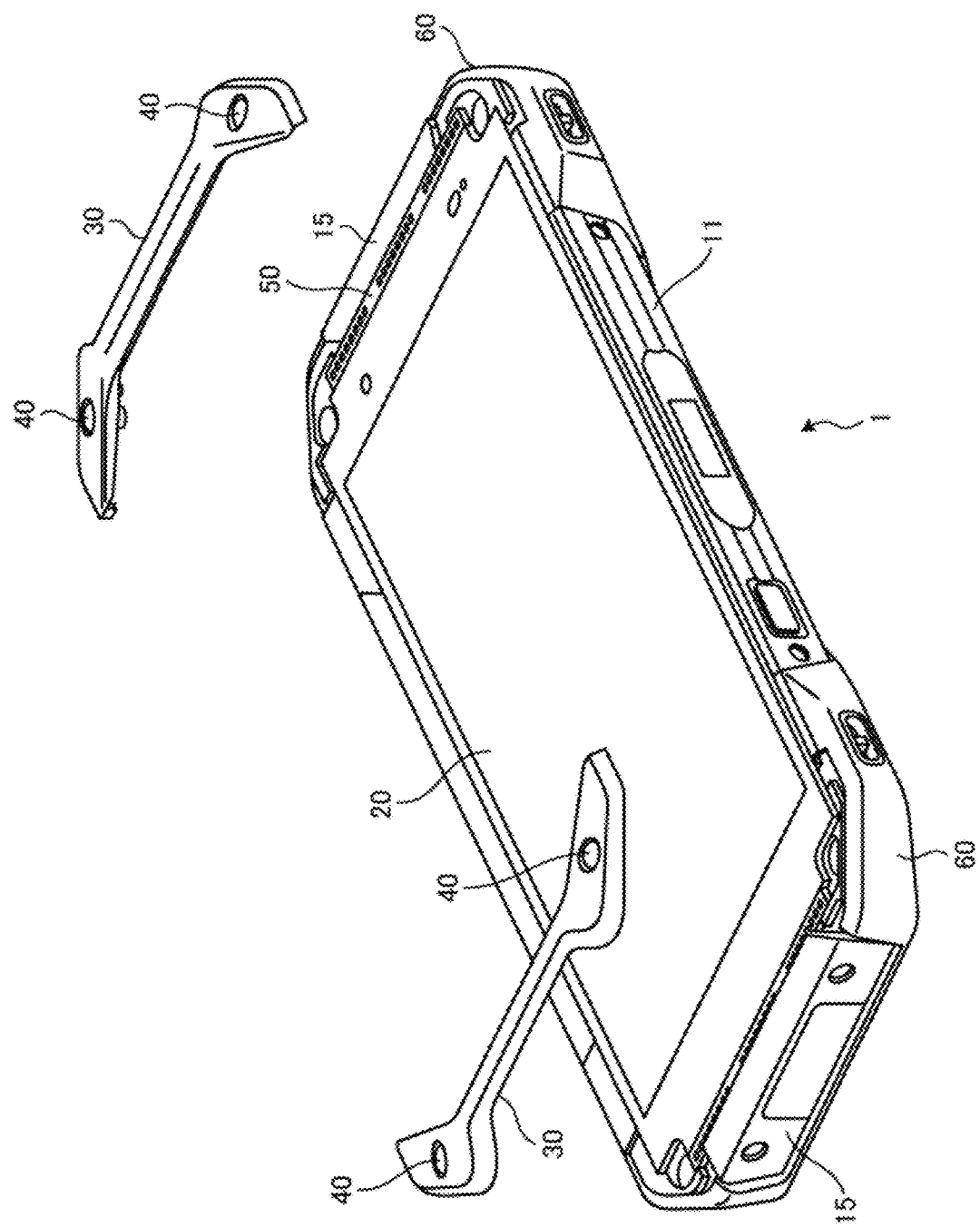
FIG. 6 is an explanatory diagram illustrating a state in which the protecting part illustrated in FIG. 2 is removed from the housing.

FIG. 6 is an explanatory diagram illustrating a state in which the protecting parts 30 illustrated in FIG. 2 are removed from the housing 10. The protecting parts 30 attached to the case part 11 included in the housing 10 by the screws 40 can be detached from the case part 11 as illustrated in FIG. 6 by removing the screws 40 from the screw holes formed in the case part 11. The protecting parts 30 are disposed at the two positions near both ends in the longitudinal direction of the smartphone 1, and each protecting part 30 can be detachably attached to the case part 11 of the housing 10 by the screws 40 serving as attaching members.

Figure 7:
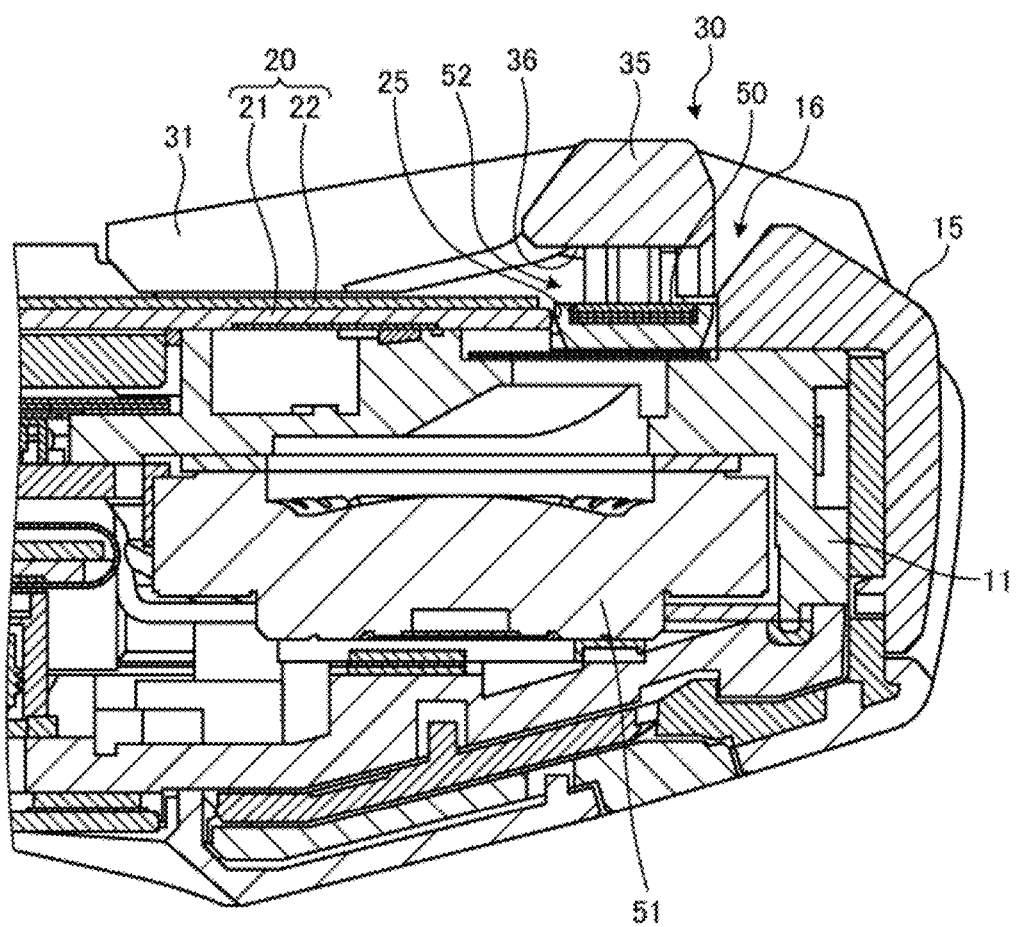
FIG. 7 is a cross-sectional view taken along line D-D in FIG. 2.
Figure 8:
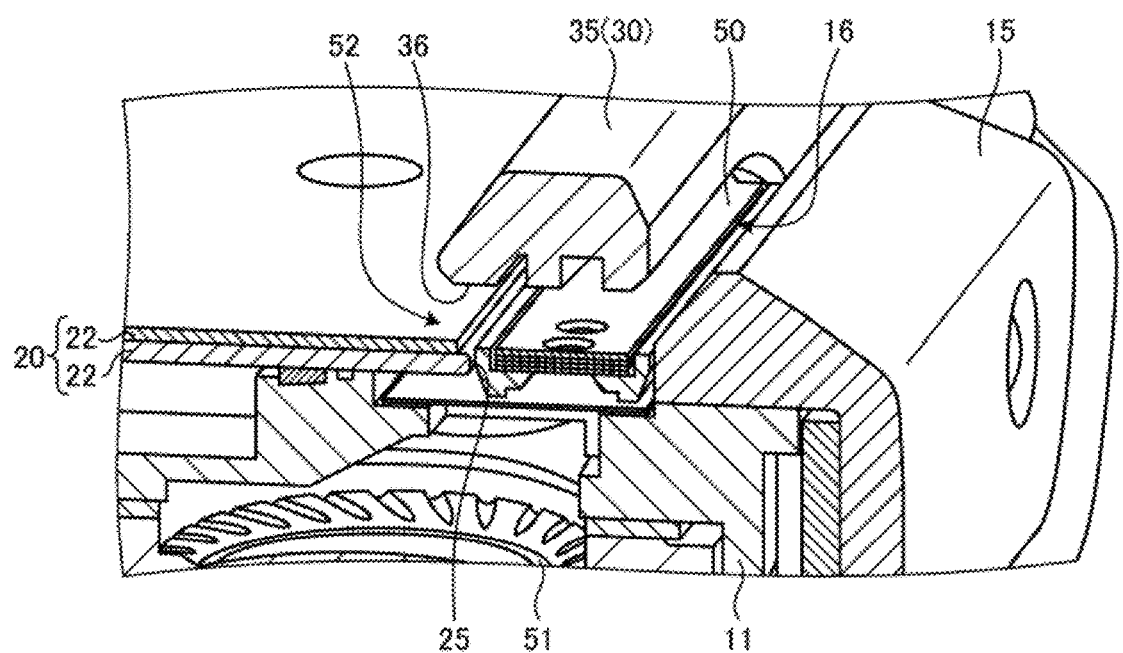
FIG. 8 is a perspective view of the cross section illustrated in FIG. 7.

FIG. 7 is a cross-sectional view taken along line D-D in FIG. 2. FIG. 8 is a perspective view of the cross section illustrated in FIG. 7. The screen unit 20 covered with the protecting part 30 includes a glass surface 21 made of glass and a protecting sheet 22 disposed on the glass surface 21. A sapphire glass or an inorganic glass may be used for the glass constituting the glass surface 21, and the type of glass constituting the glass surface 21 is not particularly limited. The protecting sheet 22 is made of a transparent resin material, is overlapped on the glass surface 21, and is joined to the glass surface 21. As a result, the screen unit 20 is formed by integrating the glass surface 21 and the protecting sheet 22. The screen unit 20 in which the glass surface 21 and the protecting sheet 22 overlap with each other is disposed in a direction in which the protecting sheet 22 side is located on the front surface side of the screen unit 20, in other words, the front surface side of the smartphone 1. As a result, the screen unit 20 is disposed in a state in which the glass surface 21 is covered with the protecting sheet 22.

In the screen unit 20, since the protecting sheet 22 is located on the surface side of the smartphone 1 in this manner, the protecting part 30 disposed to cover a part of the screen unit 20 is disposed to face the protecting sheet 22. Thus, in the protecting part 30, the contact parts 31 in contact with the screen unit 20 are in contact with the protecting sheet 22 located on the front surface side of the screen unit 20.

Figure 9:
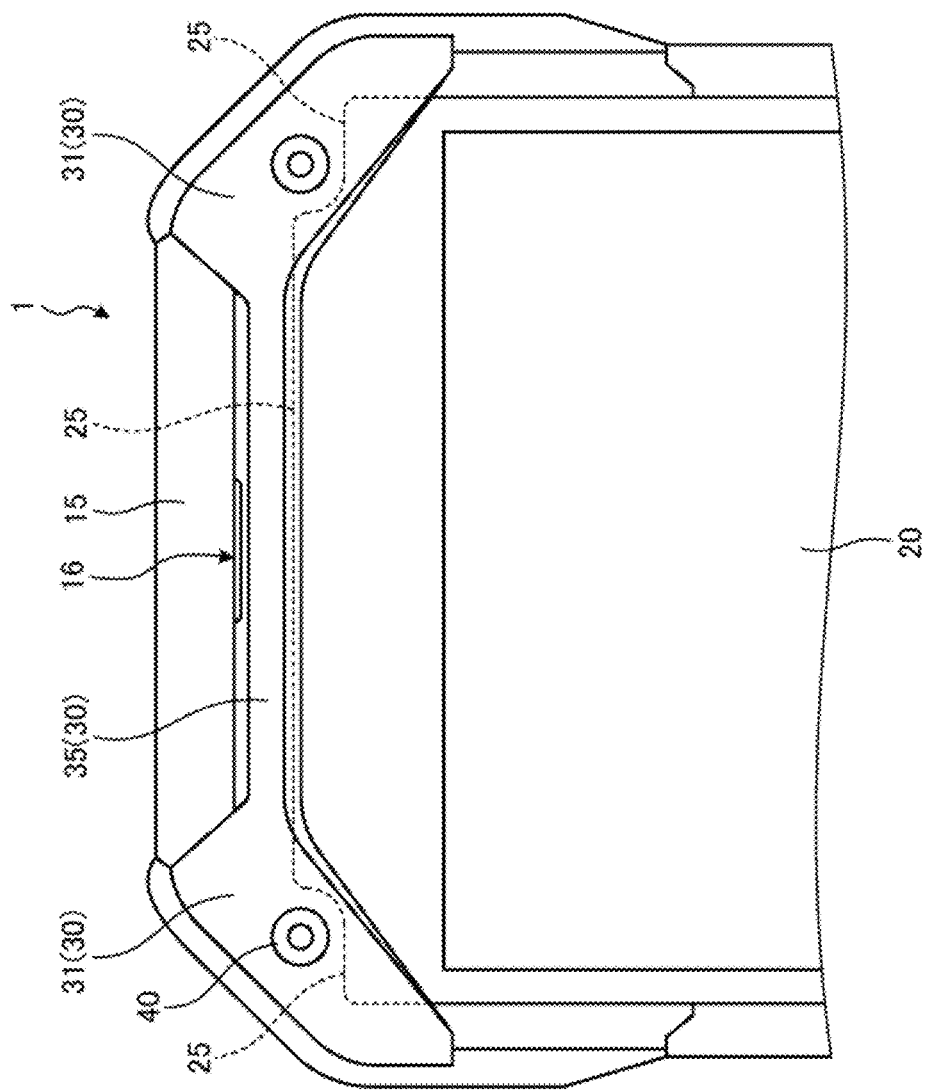
FIG. 9 is an explanatory diagram of an arrangement range of a screen unit.

FIG. 9 is an explanatory diagram of an arrangement range of the screen unit 20. FIG. 9 illustrates an end part of a portion overlapped with the protecting part 30 in the screen unit 20, by a dashed line. The protecting part 30 covers the vicinity of a screen unit end part 25, which is an end part of the screen unit 20 in the longitudinal direction, in other words, the protecting part 30 is formed and disposed in a shape overlapping the screen unit end part 25 in a front view direction of the screen unit 20. As illustrated in FIG. 9, in the protecting part 30, both the contact parts 31 and the separation part 35 overlap the screen unit 20.

Specifically, near the screen unit end part 25, in the vicinity of the positions where the screws 40 that attach the protecting part 30 to the housing 10 are disposed, the screen unit 20 is formed in a shape such that positions where the screws 40 are disposed are excluded. The contact parts 31 of the protecting part 30 are made to overlap a portion which is formed in a shape such that the positions where the screws 40 that attach the protecting part 30 to the housing 10 are disposed are excluded, near the screen unit end part 25 in this manner. The contact parts 31 are in contact with a portion overlapping the contact parts 31 in this manner in the screen unit 20.

The separation part 35 of the protecting part 30 covers a narrow range of the screen unit 20 near the screen unit end part 25. In other words, the separation part 35 of the protecting part 30 covers the vicinity of the screen unit end part 25 with a narrow width in the longitudinal direction of the screen unit 20 while being separated from the screen unit 20. As a result, in the protecting part 30, both the contact parts 31 and the separation part 35 cover a part of the screen unit 20.

Here, among the screen unit end parts 25 located on both sides in the longitudinal direction of the screen unit 20, a speaker port member 50 is disposed near the screen unit end part 25 on one side (see FIGS. 7 and 8). The speaker port member 50 is formed in a shape in which a plurality of holes are formed in a plate-like member, and is a portion for emitting a sound emitted from a speaker body 51 toward the outside. In other words, the speaker body 51 is disposed further toward the inner side of the smartphone 1 than the speaker port member 50 and is capable of emitting a sound based on an electrical signal. The speaker port member 50 is disposed with respect to the speaker body 51 via a space, and allows the sound emitted from the speaker body 51 disposed on the inner side of the smartphone 1 to be emitted to the outside through the holes formed in the speaker port member 50.

The speaker port member 50 formed in this manner is disposed adjacent to the screen unit end part 25 in substantially the same plane as the screen unit 20, and has a substantially rectangular plate-like shape with a narrow width in the longitudinal direction of the screen unit 20 and a predetermined length in the lateral direction of the screen unit 20. The separation part 35 included in the protecting part 30 is formed in a shape covering the speaker port member 50 formed in this manner in a front view direction of the screen unit 20, and is disposed to cover the speaker port member 50. Thus, in other words, the screen unit 20 and the speaker port member 50 are disposed in a position facing a separation surface 36, which is a surface facing the screen unit 20, in the separation part 35 of the protecting part 30.

Since the separation surface 36 of the separation part 35 is separated from the screen unit 20 and the speaker port member 50, the sound emitted from the speaker body 51 and passing through the hole formed in the speaker port member 50 can be emitted to the outside by passing between the separation surface 36 and the screen unit 20. As a result, a portion between the separation surface 36 of the separation part 35 and the screen unit 20 is formed as a speaker opening part 52 for emitting the sound through the holes formed in the speaker port member 50 toward the outside.

A cover member 15 is disposed on the opposite side to the side on which the screen unit 20 is disposed in the separation part 35 included in the protecting part 30. In other words, when viewing the screen unit 20 from the front, the screen unit 20 is disposed on one side of the separation part 35 in the width Ws direction from a position overlapping with the protecting part 30, and the cover member 15 is disposed on the other side of the separation part 35 in the width Ws direction.

Specifically, in the protecting part 30, since the width Ws of the separation part 35 is narrower than the width We of each of the contact parts 31, the contact parts 31 are formed to protrude from the separation part 35 by a difference in width between the contact parts 31 and the separation part 35 in the opposite direction to the bending direction of the contact part 31. In other words, in a portion of the protecting part 30 on the opposite side to the side on which the screen unit 20 is disposed, the position of the separation part 35 is formed to be recessed to the side where the screen unit 20 is disposed, further than the position of the contact parts 31.

The cover member 15 is disposed in a portion formed to be recessed toward the side on which the screen unit 20 is disposed compared with the position of the contact part 31, at the position of the separation part 35, in the portion of the protecting part 30 formed in this manner on the opposite side to the side on which the screen unit 20 is disposed. The cover member 15 is detachably attached to the case part 11 of the housing 10 by screws serving as attaching members, and the cover member 15 also constitutes the housing 10 forming the exterior of the smartphone 1.

The cover member 15 and the separation part 35 of the protecting part 30 are at least partially separated from each other. In the present embodiment, the cover member 15 and the separation part 35 are at least partially separated from each other by cutting out a portion of the separation part 35 facing the cover member 15 by a predetermined length in a direction in which a distance from the cover member 15 increases at a position near the center of the separation part 35 in the direction in which the separation part 35 extends. As described above, a part where a portion of the separation part 35 on the cover member 15 side and the cover member 15 face each other and are separated from each is formed as an opening part 16.

In other words, in a case where a side on which the screen unit 20 is disposed in the width Ws direction of the separation part 35 is one side, and the opposite side is the other side when viewing the screen unit 20 from the front, the opening part 16 formed by separating the protecting part 30 and the cover member 15 from each other is provided on the other side of the separation part 35 in the width Ws direction. The opening part 16 in this case is formed of a portion of the separation part 35 facing and separated from the cover member 15, and a portion of the cover member 15 facing the separation part 35.

The opening part 16 formed in this manner is a portion that enables the holes formed in the speaker port member 50 disposed at a position facing the separation surface 36 of the separation part 35 to communicate with an outer portion of the protecting part 30.

Figure 10:
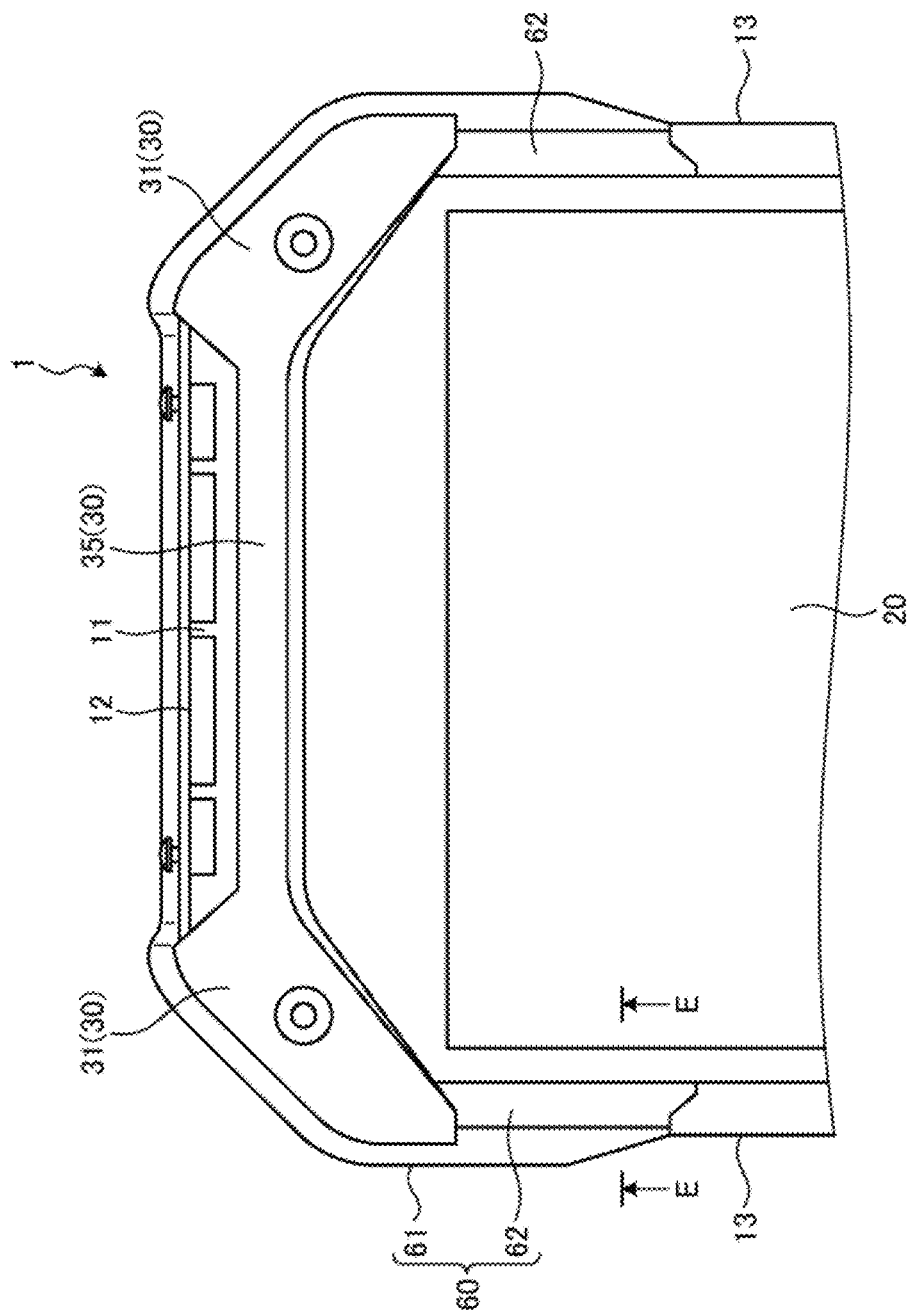
FIG. 10 is an explanatory diagram illustrating a state in which a cover member in FIG. 3 is removed.

The housing 10 includes bumpers 60 near both ends of the smartphone 1 in the longitudinal direction. FIG. 10 is an explanatory diagram illustrating a state in which the cover member 15 in FIG. 3 has been removed. Each of the bumpers 60 includes a main bumper 61 and sub bumpers 62 formed of a member having elasticity such as a resin material or a rubber material. The bumper 60 including the main bumper 61 and the sub bumpers 62 is formed by integral molding and has a higher elasticity than the case part 11. Among them, the main bumpers 61 are disposed across end surfaces 12 of the case part 11 in the longitudinal direction of the smartphone 1 and across a predetermined range near the end surfaces 12 on side surfaces 13 of the case part 11 located on long-side portions of the smartphone 1. In other words, the main bumpers 61 are disposed to cover corners where the end surfaces 12 in the longitudinal direction and the side surfaces 13 of the case part 11 intersect each other. At this time, the portions of the main bumpers 61 disposed on the side surfaces 13 of the case part 11 are disposed across a range that extends from the end surfaces 12 of the case part 11 in the longitudinal direction of the smartphone 1 further than a range across which the protecting part 30 is disposed in the longitudinal direction of the smartphone 1.

Figure 11:
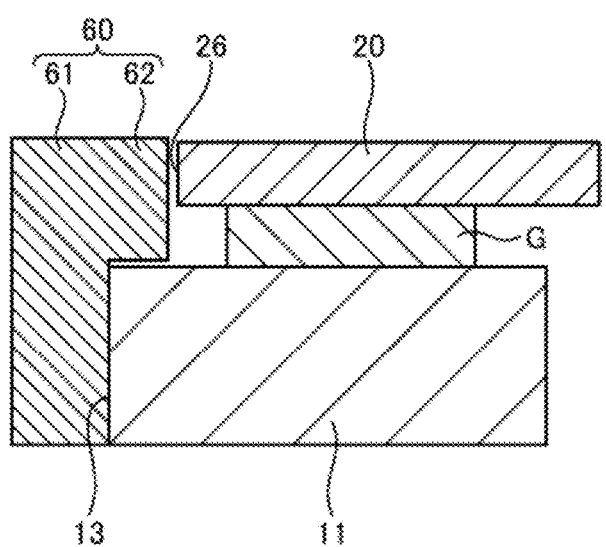
FIG. 11 is a cross-sectional schematic view in a direction E-E in FIG. 10.

Each of the sub bumpers 62 is disposed at a position between the main bumper 61 and the screen unit 20 in a portion of the main bumper 61 disposed at a position further away from the end surface 12 of the case part 11 in the longitudinal direction of the smartphone 1 than the range in which the protecting part 30 is disposed. FIG. 11 is a cross-sectional schematic view in the direction E-E in FIG. 10. The main bumpers 61 are disposed in contact with the side surfaces 13 of the case part 11, and the screen unit 20 is adhered to the case part 11 by an adhesive G. The main bumpers 61 are formed to protrude in the thickness direction of the screen unit 20 further toward the screen unit 20 side than a surface of the case part 11 on the side on which the screen unit 20 is disposed, and the main bumpers 61 are formed to protrude in the thickness direction of the screen unit 20 further than the screen unit 20.

Each of the sub bumpers 62 is disposed between the screen unit 20 and a portion of the main bumper 61 formed to protrude in the thickness direction of the screen unit 20 to the screen unit 20 side further than the case part 11. In other words, each of the sub bumpers 62 is formed to protrude from the main bumper 61 toward the side on which the screen unit 20 is located in the lateral direction of the smartphone 1. Thus, the sub bumpers 62 can come into contact with side surfaces 26 of the screen unit 20. In other words, the housing 10 is provided with the bumpers 60 including the sub bumpers 62 having elasticity and being in contact with the side surfaces 26 of the screen unit 20.

The smartphone 1 according to the present embodiment includes the configuration as described above, and an example of the effects thereof will be described below. When using the smartphone 1, a user uses the smartphone 1 by performing input operations on the screen unit 20 including the touch screen 20B with a finger, pen, or the like, and by viewing information displayed on the screen unit 20 including the display 20A, while mainly manually holding the smartphone 1.

The smartphone 1 can also emit any sound from the speaker body 51 disposed within the smartphone 1. The sound emitted from the speaker body 51 passes through the holes formed in the speaker port member 50, and is emitted from the speaker opening part 52 formed between the separation surface 36 of the separation part 35 and the screen unit 20 toward the outside, thereby allowing the user to hear the sound. The sound emitted from the speaker body 51 includes, for example, a sound playing along with a video when the video is displayed on the screen unit 20, a sound emitted by an application program when any application program is executed by the smartphone 1, and a voice of another party during a phone call when the smartphone 1 is used as a phone.

Since the smartphone 1 used in this manner can be held by the user's hand, it is conceivable that the smartphone 1 may be accidentally dropped during use or when the smartphone 1 is moved. At this time, since the screen unit 20 in which input operation and display of information are performed is exposed on the surface of the smartphone 1, when the smartphone 1 is dropped with the side on which the screen unit 20 is located facing down, the screen unit 20 comes into contact with a floor surface, an object placed on the floor, or the like, and thus a large impact easily acts on the screen unit 20. When a large impact acts on the screen unit 20, the screen unit 20 may be damaged due to the impact, making it difficult to perform input operation to the screen unit 20 or making it difficult to appropriately perform display of information by the screen unit 20.

In the present embodiment, the smartphone 1 formed in this manner is provided with the protecting part 30 disposed to cover a part of the screen unit 20. As a result, when the smartphone 1 is dropped, the protecting part 30 easily comes into contact with the floor surface, an object placed on the floor, or the like before the screen unit 20, thereby suppressing a large impact from acting on the screen unit 20 due to direct contact of the screen unit 20 with the floor surface or the like.

The protecting part 30 includes the contact parts 31 in contact with the screen unit 20, and the separation part 35 located between the contact parts 31 and separated from the screen unit 20, and is formed of a member having elasticity. As a result, when the protecting part 30 comes into contact with a floor surface or the like due to the smartphone 1 being dropped, the protecting part 30 elastically deforms in a direction in which the distance between the separation part 35 and the screen unit 20 becomes smaller, thereby allowing the impact when the protecting part 30 comes into contact with the floor surface or the like to be alleviated. In other words, a part of the screen unit 20 is covered with the protecting part 30, and the contact parts 31 and the separation part 35 are formed in the protecting part 30, thereby allowing the protecting part 30 to exert a buffering action and suppress a large impact from acting on the screen unit 20. This can improve the impact resistance.

Since the screen unit 20 includes the glass surface 21, the screen unit 20 is susceptible to damage when a large impact acts on the screen unit 20, but in such a screen unit 20, the damage to the screen unit 20 can be suppressed by covering a part of the screen unit 20 with the protecting part 30. As a result, even in a case where input operability and information display performance are ensured by using the glass surface 21 in the screen unit 20, a large impact can be suppressed from acting on the screen unit 20, and the impact resistance can be improved.

Since the screen unit 20 includes the protecting sheet 22 on the glass surface 21, damage to the glass surface 21 can be suppressed by the protecting sheet 22, and damage to the screen unit 20 can be further suppressed. Since the protecting part 30 is disposed to face the protecting sheet 22, the protecting sheet 22 can be suppressed from being peeled away from the glass surface 21 by the protecting part 30, and the damage to the glass surface 21 can be suppressed by the protecting sheet 22. This can protect the screen unit 20 and further improve the durability of the screen unit 20.

In the contact parts 31 of the protecting part 30, since the angle θa formed by the side surfaces 33 of the contact parts 31 on the separation part 35 side and the screen unit 20 is an acute angle, when a force, such as when the smartphone 1 is dropped, acts on the protecting part 30, the separation part 35 can be further elastically deformed in a direction in which the separation part 35 approaches the screen unit 20. As a result, the impact when the smartphone 1 is dropped or the like can be further alleviated by the protecting parts 30, and the impact resistance can be further improved.

In the contact parts 31 of the protecting part 30, since the curved surface parts 34 are formed between the contact surfaces 32 in contact with the screen unit 20 and the side surfaces 33 of the contact parts 31, when a force, such as when the smartphone 1 is dropped, acts on the protecting part 30, the separation part 35 can be further elastically deformed in a direction in which the separation part 35 approaches the screen unit 20. Even when a large force acts on the protecting part 30, by forming the curved surface parts 34 between the contact surfaces 32 and the side surfaces 33, stress concentration can be suppressed from occurring near the boundary portions between the contact surfaces 32 in contact with the screen unit 20 and the side surfaces 33. As a result, a large force acting on the screen unit 20 when the smartphone 1 is dropped or the like can be further suppressed by the protecting part 30, and the impact resistance can be further improved.

In each of the protecting parts 30, since the width Ws of the separation part is narrower than the width We of the contact parts, when a force, such as when the smartphone 1 is dropped, acts on the protecting part 30, the separation part 35 can be further elastically deformed in a direction in which the separation part 35 approaches the screen unit 20. As a result, an impact, such as when the smartphone 1 is dropped, can be further alleviated by the protecting parts 30, and the impact resistance can be further improved.

Since the smartphone 1 is provided with the bumpers 60 having elasticity, the impact can also be absorbed by the bumpers 60 in addition to the protecting parts 30 when the smartphone 1 is dropped. In other words, the bumpers 60 include the main bumpers 61 disposed across the side surfaces 13 from the end surfaces 12 of the case part 11, and when the smartphone 1 is dropped, an impact occurring at any of the corners where the end surfaces 12 and the side surfaces 13 of the case part 11 are connected to each other where a large impact likely occurs, can be absorbed by the main bumpers 61. This can alleviate an impact when the smartphone 1 is dropped, and can suppress damage to the smartphone 1 due to the occurrence of a large impact.

Since each of the bumpers 60 includes, in addition to the main bumper 61, the sub bumpers 62 protruding from the main bumper 61 in contact with the side surfaces 26 of the screen unit 20, a large impact can be further suppressed from acting on the screen unit 20. In other words, for example, in portions where the case part 11 faces the side surfaces 26 of the screen unit 20, when the smartphone 1 is dropped, a large force acting on the case part 11 at the time of dropping becomes a large impact to be transmitted from the case part 11 to the side surfaces 26 of the screen unit 20, and is transmitted to the screen unit 20. As a result, it is conceivable that the screen unit 20 is easily damaged due to the impact from the case part 11. In contrast, in the present embodiment, since the sub bumpers 62 having elasticity come into contact with the side surfaces 26 of the screen unit 20 at positions near the end surfaces 12 of the case part 11, even when a large force acts on the main bumper 61 when the smartphone 1 is dropped, the impact at the time of dropping can be absorbed by the sub bumpers 62. As a result, the impact at the time of dropping can be suppressed from being transmitted to the screen unit 20, and the impact resistance can be further improved.

Since the speaker port member 50 through which sound emitted from the speaker body 51 passes is disposed at a position facing the separation surface 36 facing the screen unit 20 at the separation part 35 of the protecting part 30. the sound of the speaker body 51 can be easily emitted to the outside. In other words, in the protecting part 30, the separation part 35 is separated from the screen unit 20, so that a portion between the separation part 35 and the screen unit 20 is formed as the speaker opening part 52 that can emit the sound that has passed through the holes formed in the speaker port member 50 toward the outside.

Since the speaker opening part 52 is formed by separating the separation part 35 from the screen unit 20, the speaker opening part 52 can be prevented from being blocked even when the smartphone 1 is placed with the screen unit 20 facing down. As a result, even when the smartphone 1 is placed with the screen unit 20 facing down, the smartphone 1 can emit sound emitted by the speaker body 51 and passing through the speaker port member 50 from the speaker opening part 52 to the outside. Accordingly, regardless of the state of the smartphone 1, sound emitted from the speaker body 51 can be emitted toward the outside through the speaker opening part 52, making it easier to hear the sound from the speaker body 51.

The smartphone 1 according to the present embodiment is waterproof. As a result, even when water splashes on the smartphone 1, water can be suppressed from entering a portion in which the controller and the communication unit are disposed inside the smartphone 1, and the smartphone 1 can be continuously used even after it is wet with water. When water splashes on the smartphone 1, due to the waterproof function, water does not enter a region which renders use of the smartphone 1 impossible, but water may enter other regions. Such water can be drained from the opening part 16 formed by separating the protecting part 30 and the cover member 15 of the housing 10 on the opposite side to the side on which the screen unit 20 is disposed with respect to the separation part 35 when viewing the screen unit 20 from the front.

In other words, even when water enters the inside of the smartphone 1 from the hole formed in the speaker port member 50 by the smartphone 1 being soaked in water, water can be drained from the opening part 16 adjacent to the separation part 35 covering the speaker port member 50. As a result, the water drainage performance when the speaker port member 50 is covered with the protecting part 30 can be ensured, and it is possible to achieve both ease of hearing sound and water drainage performance by disposing the protecting part 30 at a position facing the speaker port member 50.

Since the protecting part 30 is detachably attached to the housing 10, maintainability can be ensured. For example, even when the holes formed in the speaker port member 50 become clogged with foreign matter, the foreign matter can be easily removed by removing the protecting part 30. This can improve maintainability performance.

The embodiments disclosed by the present application can be modified without departing from the main point or the scope of the present disclosure. In addition, the embodiments disclosed by the present application and modified examples thereof can be combined as appropriate. For example, the embodiment described above can be modified in the following manner.

While the above embodiments have been described with the smartphone 1 as an example of an electronic device, the electronic device according to the appended claims is not limited to the smartphone 1. The electronic device according to the appended claims may be a portable electronic device other than the smartphone 1. Examples of the portable electronic device include, but are not limited to, a mobile phone, a tablet, a portable computer, a digital camera, a smart watch, a media player, an electronic book reader, a navigator, and a gaming console.

In the embodiments described above, description is made using the screen unit 20 including the display 20A and the touch screen 20B as the first surface in which a part thereof is covered with the protecting part 30, but the first surface according to the appended claims is not limited to the screen unit 20 including the display 20A and the touch screen 20B. The first surface according to the appended claims may be, for example, a display for only displaying information. The first surface is preferably a surface that becomes easily damaged due to an impact on the housing or a surface that is greatly affected when damaged.

In the embodiment described above, each of the bumpers 60 is formed by integrally forming the main bumper 61 and the sub bumpers 62, but the main bumper 61 and the sub bumpers 62 may be constituted by separate components. Even when the main bumper 61 and the sub bumpers 62 are constituted by separate components, the sub bumpers 62 having elasticity come into contact with the side surfaces 26 of the screen unit 20, so that a large impact can be suppressed from acting on the screen unit 20, and the impact resistance can be improved.

In the embodiment described above, the screen unit 20 and the speaker port member 50 are disposed at a position facing the separation surface 36 of the separation part 35 included in the protecting part 30; however, a member other than the speaker port member 50 may be disposed at the position facing the separation surface 36. For example, at the position facing the separation surface 36, a member for a microphone may be disposed, in which a plurality of holes are formed in the same manner as the speaker port member 50, through which sound is transmitted to the microphone disposed inside the smartphone 1.

The characteristic embodiments have been described in order to fully and clearly disclose the technology according to the appended claims. However, the appended claims are not to be limited to the embodiments described above, and should be configured to embody all modifications and alternative configurations that those skilled in the art may make within the underlying matter set forth herein.

REFERENCE SIGNS LIST

1 Smartphone
10 Housing
11 Case part
12 End surface
13, 26, 33 Side surface
15 Cover member
16 Opening part
20 Screen unit
20A Display
20B Touch screen
21 Glass surface
22 Protecting sheet
25 Screen unit end part
30 Protecting part
31 Contact part
32 Contact surface
34 Curved surface part
35 Separation part
36 Separation surface
40 Screw
50 Speaker port member
51 Speaker body
52 Speaker opening part
60 Bumper
61 Main bumper
62 Sub bumper

The invention claimed is:

1. An electronic device comprising:
a protecting part covering a first part of a first surface of a housing and not covering a second part of the first surface of the housing, wherein
the protecting part comprises:
contact parts located at both ends in a longitudinal direction of the protecting part and being in contact with the first surface, and
a separation part located between the contact parts and spaced from the first surface, and
both the contact parts and the separation part are above the first surface of the housing and are closer to the first surface than a second surface of the housing, the second surface opposite to the first surface.

2. The electronic device according to claim 1, wherein the first surface comprises a glass surface.

3. The electronic device according to claim 2, wherein the first surface comprises a protecting sheet on the glass surface; and
the protecting part is disposed to face the protecting sheet.

4. The electronic device according to claim 1, wherein in the contact parts, an angle formed by side surfaces of the contact parts on the separation part side and the first surface is an acute angle.

5. The electronic device according to claim 4, wherein in the contact parts, contact surfaces in contact with the first surface at the contact parts and the side surfaces are connected to each other by curved surfaces.

6. The electronic device according to claim 1, wherein the first surface and a speaker port member are disposed at a position facing a separation surface of the separation part facing the first surface.

7. The electronic device according to claim 1, wherein in the protecting part, a width in a direction orthogonal to a direction in which the protecting part extends is narrower in the separation part than in the contact parts when viewing the first surface from the front.

8. The electronic device according to 1, wherein the first surface is disposed on one side of the separation part in a width direction from a position overlapping with the protecting part when viewing the first surface from the front; and
an opening part formed by separating the protecting part and the housing is provided on the other side of the separation part in the width direction when viewing the first surface from the front.

9. The electronic device according to claim 1, wherein the protecting part is detachably attached to the housing.

10. The electronic device according to claim 1, wherein the housing comprises a bumper having elasticity and being in contact with a side surface of the first surface.

11. The electronic device according to claim 1, further comprising:
a further protecting part spaced from the protecting part, covering the second part of the first surface of the housing and not covering the first part of the first surface of the housing.

12. The electronic device according to claim 1, wherein the contact parts include:
a first contact part located at a first end in a widthwise direction of the first surface, and being in contact with the first surface, and
a second contact part located at a second end in the widthwise direction of the first surface, and being in contact with the first surface, and
the separation part is entirely located between the first contact part and the second contact part and spaced from, and without contact with, the first surface.

13. The electronic device according to claim 1, wherein when viewed in a normal direction to the first surface, the contact parts are bent with respect to the separation part and are connected to the separation part.

14. The electronic device according to claim 1, wherein when viewed along the first surface in a direction orthogonal to the longitudinal direction of the protecting part, each of the contact parts comprises:
   a contact surface in contact with the first surface, and
   a side surface facing the first surface and inclined with respect to the first surface in a direction in which a distance from the side surface to the first surface increases from the contact surface toward the separation part.

15. The electronic device according to claim 1, wherein when viewed in a normal direction to the first surface, and on a side opposite to the second part of the first surface,
   a position of the separation part is recessed toward the second part of the first surface further than positions of the contact parts.

16. The electronic device according to claim 1, wherein the contact parts and the separation part are continuously connected to each other on a same side of the housing on which the first surface is formed.

17. The electronic device according to claim 1, wherein the separation part of the protecting part bridges between the contact parts and covers the first surface of the housing.

\* \* \* \* \*